(12) United States Patent
Masterson et al.

(10) Patent No.: US 7,801,661 B2
(45) Date of Patent: Sep. 21, 2010

(54) POWER BOOST SYSTEM AND METHOD

(75) Inventors: Brandon Masterson, Dexter, MI (US);
Steven Schondorf, Dearborn, MI (US);
Scott Gaboury, Ann Arbor, MI (US);
Francis T. Connolly, Ann Arbor, MI (US); William Paul Perkins, Dearborn, MI (US)

(73) Assignee: Ford Global Technologies, Derborn, MI (US)

( * ) Notice: Subject to any disclaimer, the term of this patent is extended or adjusted under 35 U.S.C. 154(b) by 557 days.

(21) Appl. No.: 11/760,181

(22) Filed: Jun. 8, 2007

(65) Prior Publication Data

US 2008/0306670 A1    Dec. 11, 2008

(51) Int. Cl.
G06F 19/00    (2006.01)
H02J 7/00    (2006.01)

(52) U.S. Cl. ............... 701/99; 701/36; 701/69; 701/110; 903/904; 903/908; 180/65.21; 180/65.26

(58) Field of Classification Search .............. 701/22, 701/49, 99; 180/65.21; 903/902, 904–908
See application file for complete search history.

(56) References Cited

U.S. PATENT DOCUMENTS

| 4,242,922 | A |   | 1/1981  | Baudoin |
|---|---|---|---|---|
| 4,606,197 | A | * | 8/1986  | Takahashi et al. ............. 62/133 |
| 5,014,200 | A |   | 5/1991  | Chunkrlik et al. |
| 5,627,438 | A |   | 5/1997  | Barrett |
| 6,223,117 | B1 |   | 4/2001  | Labuhn et al. |
| 6,244,986 | B1 |   | 6/2001  | Mori et al. |
| 6,295,500 | B1 |   | 9/2001  | Cullen et al. |
| 6,470,256 | B1 |   | 10/2002 | Cikalo et al. |
| 6,560,525 | B1 |   | 5/2003  | Joyce et al. |
| 6,832,148 | B1 |   | 12/2004 | Bennett et al. |
| 6,941,216 | B2 |   | 9/2005  | Isogai et al. |
| 7,025,042 | B2 | * | 4/2006  | Gray, Jr. ..................... 123/435 |
| 7,455,134 | B2 | * | 11/2008 | Severinsky et al. ....... 180/65.28 |
| 2004/0044448 | A1 | * | 3/2004  | Ramaswamy et al. ......... 701/22 |
| 2007/0288131 | A1 | * | 12/2007 | Yakes et al. ................... 701/22 |
| 2008/0064559 | A1 | * | 3/2008  | Cawthorne et al. ............. 477/5 |
| 2009/0143929 | A1 | * | 6/2009  | Eberhard et al. .............. 701/22 |

FOREIGN PATENT DOCUMENTS

| GB | 0810180.0  | 10/2008 |
|---|---|---|
| JP | 2003335151 | 11/2003 |
| JP | 2003343305 | 12/2003 |

* cited by examiner

*Primary Examiner*—Thomas G Black
*Assistant Examiner*—Lin B Olsen
(74) *Attorney, Agent, or Firm*—David Kelley, Esq.; Tung & Associates

(57) ABSTRACT

A power boost system and method. An illustrative embodiment of the power boost system includes an operator interface having a system activation button; a vehicle system controller connected to the operator interface; and at least one of an engine system controller, a battery system controller and an accessory system controller connected to the vehicle system controller.

18 Claims, 1 Drawing Sheet

POWER BOOST SYSTEM AND METHOD

FIELD

The present invention relates to vehicles. More particularly, the present invention relates to a power boost system and method which temporarily boosts power available to a vehicle's drive system when needed.

BACKGROUND

Trucks and SUVs traditionally provide versatility for towing and hauling. However, the power which is necessary for towing and hauling is typically provided by high-capacity engines on the trucks and SUVs. Marketing surveys have indicated that many buyers of these types of vehicles use the vehicles for towing and hauling purposes only on rare occasion, although these buyers would like to have the towing and hauling capacities of the vehicles available to them at all times. Utilizing powerful engines and reserve towing capacity, however, on vehicles usually results in a compromised fuel economy for the vehicles.

A reasonable load can be towed or hauled using a vehicle with a smaller engine, although problems can arise over the short term in particularly demanding situations. For example, pulling a boat on a trailer out of a body of water and up a boat ramp requires a high output of towing power over a short period of time. Once the trailer which carries the boat reaches level ground, the trailer can be towed using a substantially lower power output. Therefore, the capability to selectively and temporarily appropriate a large quantity of power output when necessary and then switch to a lower quantity of power output when the high power output is no longer necessary would both substantially conserve fuel and reduce emissions in the long-term.

SUMMARY

The present invention is generally directed to a power boost system. An illustrative embodiment of the power boost system includes an operator interface having a system activation button; a vehicle system controller connected to the operator interface; and at least one of an engine system controller, a battery system controller and an accessory system controller connected to the vehicle system controller.

The present invention is further generally directed to a method of temporarily boosting power available to a vehicle having a vehicle engine and accessories. An illustrative embodiment of the method includes providing an operator interface having a system activation button; connecting a vehicle system controller to the operator interface; connecting the accessories to the vehicle system controller; and at least suppressing operation of the accessories by operation of the operator interface.

BRIEF DESCRIPTION OF THE DRAWINGS

The invention will now be described, by way of example, with reference to the accompanying drawings, in which.

DETAILED DESCRIPTION

Figure 1:
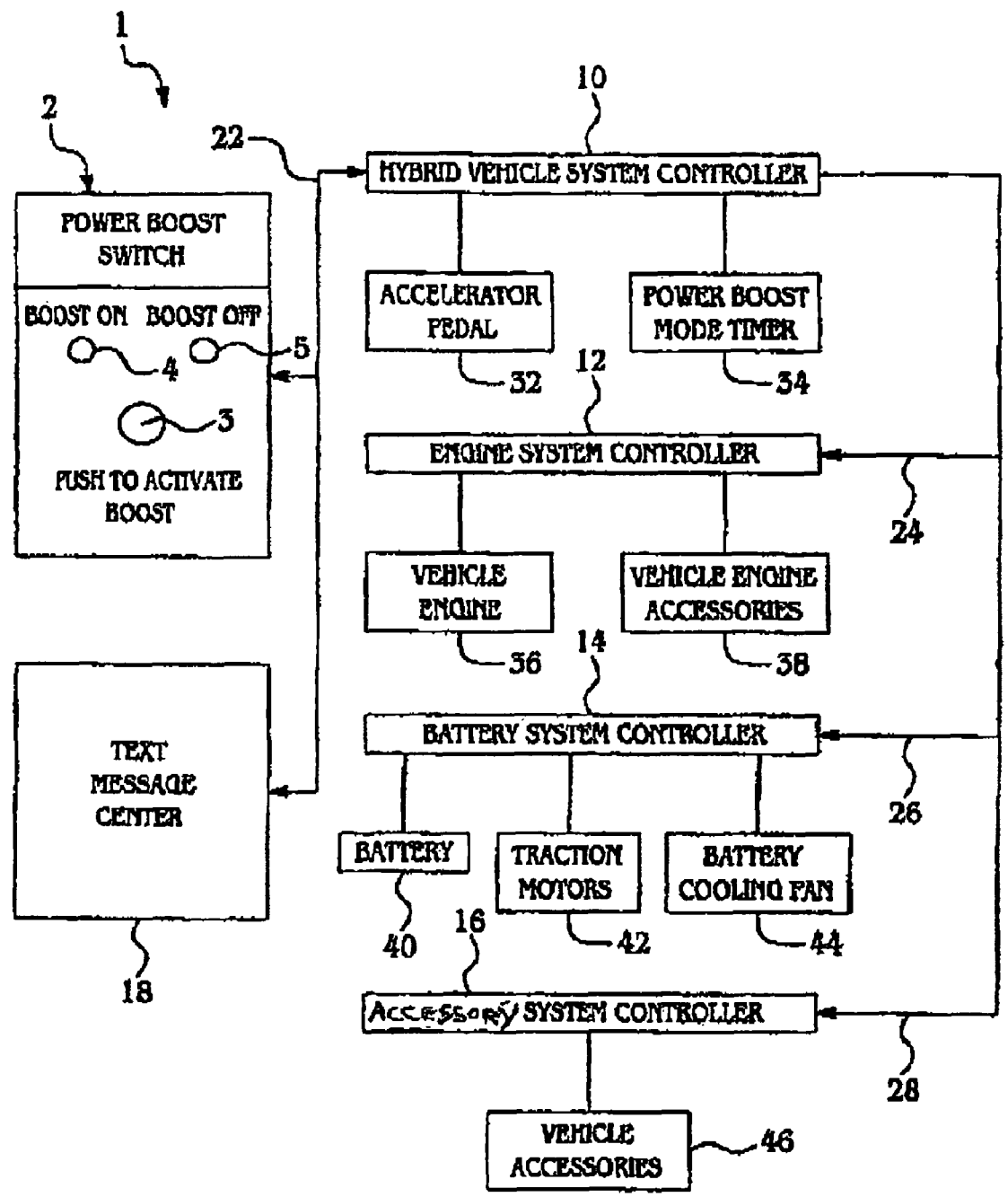
FIG. 1 is a schematic diagram of an illustrative embodiment of the power boost system and method.

The present invention is directed to a power boost system and method which temporarily boosts power available to a vehicle's drive system when needed. The power boost system includes an operator-actuated power boost operator interface which may be a switch, button or menu that is provided on a dashboard or in a suitable alternative location in a vehicle. Selective actuation of the power boost operator interface initiates an operational strategy which provides a temporary boost in vehicle power available to assist in short-term, high-demand power situations such as towing and hauling, for example. The vehicle performance changes induced by actuation of the power boost operator interface are temporary and in some embodiments are configured to time-out automatically. In other embodiments, the vehicle performance changes are controlled by a software logic program which terminates the high-power mode of the vehicle when the program concludes that the additional power is no longer necessary.

The power boost system utilizes any or a combination of multiple mechanisms to achieve the temporary boost in power which is available to the vehicle upon actuation of the power boost operator interface. These mechanisms may include changing of engine performance calibration parameters in a conventional or hybrid vehicle to trade-off fuel economy or by controlling NVH (noise, vibration and harshness) and/or emissions to harvest extra power. Additionally, in a hybrid electric vehicle (HEV), parameters for the electric motors and battery system are adjusted to tradeoff electric motor thermal protection, battery output and/or battery state-of-charge protection to gain temporary extra power. Engines equipped with "variable valve actuation" technology (VVA, EVA, etc) could alter engine operation drastically enough to change combustion cycles, such as changing from Atkinson Cycle (popular in hybrid vehicles) to Otto Cycle in order to increase power output. The HEV vehicle control system may additionally free up more electrical energy for the temporary power boost by inhibiting other vehicle accessory features such as electric air conditioning and electric power steering assist, for example. Software controls are typically implemented to monitor usage of the feature to avoid overuse and prevent damaging of system and vehicle components.

Referring to FIG. 1 of the drawings, an illustrative embodiment of the power boost system is generally indicated by reference numeral 1. In the example shown in FIG. 1, the power boost system 1 is implemented in a hybrid electric vehicle (HEV) (not shown); however, it is to be understood that the power boost system 1 may alternatively be used in a conventional or electric vehicle. The power boost system 1 includes an operator interface 2 which may be a switch, button or menu that is provided on a dashboard or in a suitable alternative location in the vehicle (not shown). A system activation button 3 is provided on the operator interface 2 to facilitate selective activation of the power boost system 1 by an operator (not shown) of the vehicle. In some embodiments, a "system on" indication light 4 is provided on the operator interface 2 to indicate an "on" status of the power boost system 1. In some embodiments, a "system off" indication light 5 is provided on the operator interface 2 to indicate an "off" status of the power boost system 1.

The operator interface 2 interfaces with a hybrid vehicle system controller 10 of the vehicle. In turn, the hybrid vehicle system controller 10 interfaces with at least one of an engine system controller 12, a battery system controller 14 and an accessory system controller 16 of the vehicle. In some embodiments, a text message center 18 is connected to the hybrid vehicle system controller 10. An accelerator pedal 32 of the vehicle is typically connected to the hybrid vehicle system controller 10. In some embodiments, a power boost mode timer 34 is connected to the hybrid vehicle system controller 10.

The hybrid vehicle system controller 10 is adapted to monitor the status of a power boost mode request received from the operator interface 2; instruct the engine system controller 12, the battery system controller 14 and/or the accessory system controller 16, typically via activation signals 24, 26 and/or 28, respectively, to enter the power boost mode; monitor power input from the vehicle operator via the accelerator pedal 32 of the vehicle; time the duration of the power boost mode by operation of the power boost mode timer 34; instruct the engine system controller 12, the battery system controller 14 and/or the accessory system controller 16 to return to normal operation when a predetermined operational time period for the power boost mode has elapsed, typically as determined by the power boost mode timer 34; and provide feedback of the power boost mode status via the "system on" indication light 4, the "system off" indication light 5 and/or the text messaging center 18. In some embodiments, the hybrid vehicle system controller 10 is adapted to provide feedback of the power boost mode status in the form of a boost power flow diagram (not shown) or using other visual effects. After the predetermined time period for the power boost mode has elapsed, the hybrid vehicle system controller 10 typically terminates the power boost mode operation of the engine system controller 12, the battery system controller 14 and/or the accessory system controller 16, respectively, through corresponding termination signal or signals.

A vehicle engine 36 and various vehicle accessories 38 are connected to the engine system controller 12. The vehicle engine accessories 38 include components which operate in conjunction with the vehicle engine 36 and require mechanical or electrical power but are not necessary for short-term functioning of the vehicle engine 36 during operation. The vehicle accessories may include, for example, A/C compressors; alternators; electric water pumps; and engine cooling fans.

The engine system controller 12 is adapted to temporarily adjust engine calibration parameters as tradeoffs to increase output power capability of the vehicle engine 36 at the possible expense of NVH (noise, vibration and harshness), fuel economy and emissions in the event that the power boost mode is requested. Engine calibration parameters which may be temporarily adjusted by the engine system controller 12 include, for example, alteration of valve actuation via VVA or EVA technology to change combustion cycles of the vehicle engine 36 in order to increase engine output; short-term reduction of FEAD (front end accessory drive) loads of some of the vehicle engine accessories 38 (AC compressor, alternator, open thermostat or coolant valve); suppression or termination of some of the vehicle engine accessories 38 (electric A/C, electric water pump and other high-voltage loads); termination of operation of the engine cooling fan; and deactivation of an active FEAD belt tensioner to reduce load.

At least one vehicle battery 40 and a battery cooling fan 44 are connected to the battery system controller 14. Traction motors 42 of the vehicle are further connected to the battery system controller 14. The battery system controller 14 is adapted to temporarily adjust (reduce) thermal and SOC battery protection limits of the at least one battery 40 in the event that the power boost mode is requested. This allows increased output power of the battery 40 at the possible expense of battery life. Some of the parameters of the battery 40 which can be adjusted during the power boost mode include, without limitation, transmission of battery power to the traction motors 42 without requesting recharge to reduce alternator/generator load such that maximum power from the battery 40 can be transmitted to the vehicle wheels (not shown) through the traction motors 42; raising of the temperature at which the power from the battery 40 which is available for traction is reduced; and turning off of the battery cooling fan 44.

Various vehicle accessories 46 are connected to the accessory system controller 16. The accessory system controller 16 is adapted to disable all non-essential, non-regulatory electrical or FEAD loads such that the maximum available engine and electrical power is available for delivery to the wheels in the event that the power boost mode is requested. Some of the accessory loads that can be disabled during the power boost mode include, without limitation, cutting off of the vehicle accessories 46 such as the A/C; the heat boost pump; the rear window defroster; entertainment systems (DVD, etc.); heated seats, mirrors and windshield; and the radio, climate control system, interior lights and any other non-essential accessory component or load.

In typical implementation, the power boost system 1 is installed in a vehicle (not shown) such as a conventional internal combustion engine-driven vehicle or electric vehicle, for example. In the example shown in FIG. 1, the power boost system 1 is installed in a hybrid electric vehicle (HEV). The operator interface 2 of the system 1 is typically installed on a dashboard (not shown) or in any suitable alternative location in the vehicle. The operator interface 2 is connected to the hybrid vehicle system controller 10. The hybrid vehicle system controller 10 is connected to at least one of the engine system controller 12, the battery system controller 14 and the accessory system controller 16 of the vehicle. In some embodiments, the text message center 18 is connected to the hybrid vehicle system controller 10.

Under circumstances in which towing or hauling power the magnitude of which is beyond the normal operational capabilities of the vehicle is needed, an operator (not shown) of the vehicle (not shown) manually actuates the system activation button 3 of the operator interface 2. Accordingly, the operator interface 2 transmits an activation signal 22 to the hybrid vehicle system controller 10. In response, the hybrid vehicle system controller 10 instructs at least one of the engine system controller 12, the battery system controller 14 and the accessory system controller 16 to enter the power boost mode through corresponding activation signals 24, 26 and 28, respectively. The hybrid vehicle system controller 10 typically also monitors power from the accelerator pedal 32 of the vehicle and times the duration of the power boost mode via operation of the power boost mode timer 34. In some embodiments, after a predetermined period of time for the power boost mode has elapsed, the hybrid vehicle system controller 10 instructs the engine system controller 12, the battery system controller 14 and/or the accessory system controller 16 to terminate the power boost mode and return to normal operation. The hybrid vehicle system controller 10 typically also provides feedback to the operator interface 2 regarding the status of the power boost mode by illumination of the "system on" indicator light 4 or the "system off" indicator light 5, as appropriate. In some embodiments, the hybrid vehicle system controller 10 transmits the "on" or "off" status of the power boost mode to the text message center 18.

Upon receiving the activation signal 24 from the hybrid vehicle system controller 10, the engine system controller 12 temporarily adjusts the engine calibration parameters of the vehicle to increase output power capability of the vehicle engine 36 at the expense of NVH, fuel economy and emissions. The engine calibration parameters which are adjusted by the hybrid vehicle system controller 10 include one or more of the following: alteration of valve actuation via VVA or EVA technology to change combustion cycles of the vehicle engine 36 in order to increase engine output; short-term reduction of FEAD (front end accessory drive) loads exerted by some of the vehicle engine accessories 38 (AC compressor, alternator, open thermostat or coolant valve); suppression of other vehicle engine accessories 38 such as the electric A/C, electric water pump and other high-voltage loads; termination of operation of vehicle engine accessories 38 such as the engine cooling fan; and deactivation of an active FEAD belt tensioner to reduce load.

Upon receiving the activation signal 26 from the hybrid vehicle system controller 10, the battery system controller 14 temporarily adjusts thermal and SOC protection limits of the at least one battery 40 to allow increased battery output power at the possible expense of battery life. The parameters of the battery 40 which can be adjusted during the power boost mode include one or more of the following: transmission of electrical power from the battery 40 to the traction motors 42 without requesting recharge to reduce alternator/generator load such that maximum electrical power can be transmitted from the traction motors 42 to the vehicle wheels (not shown); raising of the temperature at which the battery power available for traction is reduced; and turning off of the battery cooling fan 44.

Upon receiving the activation signal 28 from the hybrid vehicle system controller 10, the accessory system controller 16 temporarily disables all non-essential, non-regulatory electrical or FEAD loads exerted by the vehicle accessories 46. This enables that the maximum available engine and electrical power is available for delivery to the wheels (not shown) of the vehicle. The electrical or FEAD loads which are disabled during the power boost mode include one or more of the following: cutting off of the A/C; the heat boost pump; the rear window defroster; entertainment systems (DVD, etc.); heated seats, mirrors and windshield; and the radio, climate control system, interior lights and any other non-essential accessory component or load.

The individual or combined effect of the actions facilitated by the engine system controller 12, the battery system controller 14 and/or the accessory system controller 16, responsive to initiation by the hybrid vehicle system controller 10, throughout the power boost mode is to increase the quantity of electrical power which is available to the motor or motors (not shown) of the vehicle. Consequently, the vehicle is capable of accomplishing the towing or hauling task which is necessary for the relatively short duration of the power boost mode. After the predetermined operational time period for the power boost mode as determined by the hybrid vehicle system controller 10 has elapsed, the engine system controller 12, the battery system controller 14 and/or the accessory system controller 16 resume normal operation. This facilitates operation of the vehicle within the normal operational capabilities of the vehicle, thereby conserving fuel and reducing exhaust emissions.

While the preferred embodiments of the invention have been described above, it will be recognized and understood that various modifications can be made in the invention and the appended claims are intended to cover all such modifications which may fall within the spirit and scope of the invention.

What is claimed is:

1. A power boost system, said power boost system configured to alter vehicle performance thereby increasing power available for use by a vehicle drive system, comprising:
    an operator interface having a system activation function;
    a vehicle system controller connected to said operator interface; and
    at least one of an engine system controller, a battery system controller and an accessory system controller connected to said vehicle system controller;
    wherein said power boost system is configured to alter said vehicle performance to increase power available for use by said drive system upon operation of said system activation function according to one or more of the following configurations:
    wherein said engine system controller is adapted to at least suppress operation of said vehicle engine accessories;
    wherein said battery system controller is adapted to adjust battery protection limits of at least one said vehicle battery;
    wherein said accessory system controller is adapted to terminate operation of said vehicle accessories; and
    wherein said engine system controller is adapted to change a combustion cycle of said vehicle engine.

2. The power boost system of claim 1 further comprising a "system on" indication light provided on said operator interface.

3. The power boost system of claim 1 further comprising a "system off" indication light provided on said operator interface.

4. The power boost system of claim 1 further comprising a text message center connected to said vehicle system controller.

5. The power boost system of claim 1 wherein said vehicle system controller comprises a hybrid vehicle system controller.

6. The power boost system of claim 1 wherein said at least one of an engine system controller, a battery system controller and an accessory system controller comprises an engine system controller and a battery system controller connected to said vehicle system controller.

7. The power boost system of claim 1 wherein said at least one of an engine system controller, a battery system controller and an accessory system controller comprises an engine system controller and an accessory system controller connected to said vehicle system controller.

8. The power boost system of claim 1 wherein said at least one of an engine system controller, a battery system controller and an accessory system controller comprises a battery system controller and an accessory system controller.

9. A power boost system, said power boost system configured to alter vehicle performance thereby increasing power available for use by a vehicle drive system, comprising:
    an operator interface having a system activation function;
    a vehicle system controller connected to said operator interface;
    an engine system controller connected to said vehicle system controller and a vehicle engine connected to said engine system controller;
    a battery system controller connected to said vehicle system controller and at least one battery and traction motors connected to said battery system controller; and
    an accessory system controller connected to said vehicle system controller and vehicle accessories connected to said accessory system controller;
    wherein said power boost system is configured to alter said vehicle performance to increase power available for use by said drive system upon operation of said system activation function according to one or more of the following configurations:
    wherein said engine system controller is adapted to at least suppress operation of said vehicle engine accessories;
    wherein said battery system controller is adapted to adjust battery protection limits of said at least one battery;
    wherein said accessory system controller is adapted to terminate operation of said vehicle accessories; and, wherein said engine system controller is adapted to change a combustion cycle of said vehicle engine.

10. The power boost system of claim 9 further comprising a "system on" indication light provided on said operator interface.

11. The power boost system of claim 9 further comprising a "system off" indication light provided on said operator interface.

12. The power boost system of claim 9 further comprising a text message center connected to said vehicle system controller.

13. The power boost system of claim 9 wherein said vehicle system controller comprises a hybrid vehicle system controller.

14. The power boost system of claim 9 wherein said engine system controller is adapted to change a combustion cycle of said vehicle engine.

15. A method of temporarily boosting power available to a vehicle having a vehicle engine and accessories, comprising:
  providing an operator interface having a system activation function;
  connecting a vehicle system controller to said operator interface;
  connecting said vehicle system controller to at least one of an engine system controller, a battery system controller and an accessory system controller connected to said vehicle system controller; and,
  temporarily altering vehicle performance by operating said system activation function to thereby increase power available to said vehicle drive system, said altering of said vehicle performance comprising one or more of the following:
  at least suppressing operation of said vehicle engine accessories by said engine system controller;
  adjusting battery protection limits of at least one said vehicle battery by said battery system controller;
  terminating operation of said vehicle accessories by said accessory system controller; and
  changing a combustion cycle of said vehicle engine by said engine system controller.

16. The method of claim 15 wherein said at least suppressing operation of said vehicle engine accessories by operation of said operator interface comprises altering said vehicle performance for a predetermined period of time.

17. The method of claim 15 further comprising providing a "system on" indication light on said operator interface and illuminating said "system on" indication light during said at least suppressing operation of said accessories by operation of said operator interface.

18. The method of claim 15 wherein said altering said vehicle performance comprises reducing thermal and SOC battery protection limits of said at least one said vehicle battery.

* * * * *